J. L. RUSSELL.
LEVEL.
APPLICATION FILED MAY 7, 1909.
965,659.
Patented July 26, 1910.
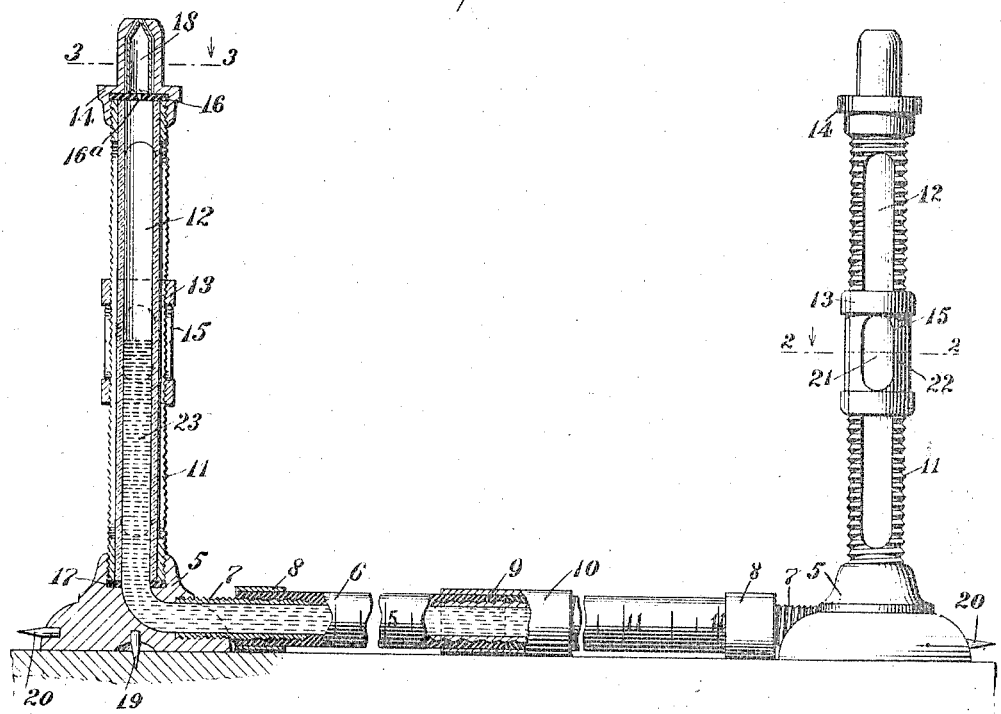
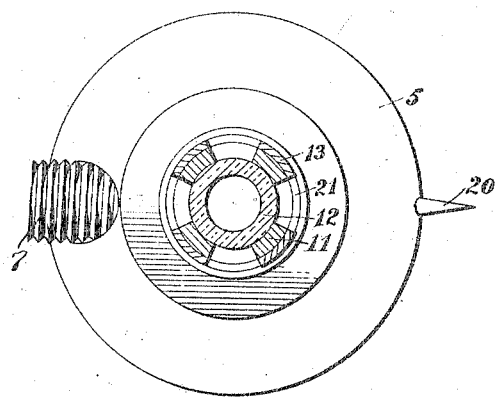
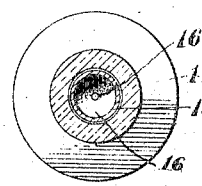
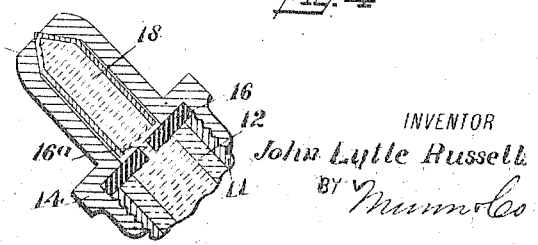
WITNESSES
INVENTOR
John Lytle Russell
BY Munn & Co
ATTORNEYS

UNITED STATES PATENT OFFICE.

JOHN LYTLE RUSSELL, OF ALBION, CALIFORNIA.

LEVEL.

965,659.  Specification of Letters Patent.  Patented July 26, 1910.

Application filed May 7, 1909. Serial No. 494,593.

*To all whom it may concern:*

Be it known that I, JOHN LYTLE RUSSELL, a citizen of the United States, and a resident of Albion, in the county of Mendocino and State of California, have invented a new and Improved Level, of which the following is a full, clear, and exact description.

The invention is an improvement in levels of the character disclosed in Letters Patent Number 825,760, granted to me July 10, 1906, the same embodying transparent tubes connected together at their lower ends by a flexible tube, the whole being sufficiently filled with a liquid to stand in both tubes at the same time.

The present invention contemplates a level of the same general construction which may be operated by one person, even though the view be obstructed between two accessible points between which the level is taken, and consists of novel features as defined in the appended claims.

Reference is to be had to the accompanying drawings forming a part of this specification, in which similar characters of reference indicate corresponding parts in all the views.

Figure 1 is a broken side elevation, partly in central vertical section, of a level having my improvements; Fig. 2 is a cross-section of the same on the line 2—2 of Fig. 1; Fig. 3 is a cross-section on the line 3—3 of Fig. 1; and Fig. 4 is a central longitudinal section through the upper end portion of one of the tubular standards.

The invention primarily consists of tubular standards adapted to contain a liquid, each having a seating base 5 through which the standards are connected together by a flexible tube or hose 6. For this purpose a nipple 7 is threaded into the side of each base 5, and has a corrugated outer end portion over which the hose is forced and is pressed into the corrugations by a band or collar 8. The hose 6 is constructed of two or more sections, the sections being coupled together by a corrugated nipple 9 extending into the abutting ends of the hose, and a collar 10 surrounding the two sections of the hose and forcing them into the corrugations, as in the case of the collars 8. The shape and size of the bases 5 are such as to prevent the tubular standards from being easily tipped over, and each has an internally-threaded recess at the top, into which is screwed a pipe 11, longitudinally slotted at opposite sides and surrounding a glass tube 12, the pipe and tube forming the body of the standard. The pipes 11 are threaded throughout their length and each is provided with an internally-threaded sleeve 13 and a similarly-threaded cap 14, the caps being arranged at and forming the tops of the standards, and the sleeves being located at points intermediate the length of the standards and each having openings or slots 15 at opposite sides, arranged to register with the slots in the sides of the device 11.

Gaskets 16 and 17 are respectively placed at the opposite ends of the body portions of the tubular standards and provide liquid-tight joints at the caps and bases, the gasket 16 which is arranged under the cap, having a relatively small central aperture 16$^a$. The caps 14 each have a tubular air chamber above the adjacent gasket, which has a contracted opening extending through the top, preferably of conical form. A thimble valve 18 having a correspondingly-shaped upper end is arranged in each of the air chambers, and has its lower edge nicked to admit of the draining of the water or other liquid which the level contains and permit the admission of air alike at both ends of the level.

Each seating base 5 of the tubular standards has a centrally arranged prick-punch 19 projecting from its under side, and similar punches 20 extending from the side directly opposite the connection with the hose 6. At the same elevation above their respective bases 5, each glass tube 12 has a hair line 21 arranged about midway its height and similar lines 22 are placed on the sleeves 13 near the centers of the openings 15.

The level is filled with water or other suitable liquid 23 until the level of the liquid stands in both standards even with the hair lines 21, and in using the level one standard is seated at the point to which the level is to be referred, and the other standard is carried to the place at which the level is to be determined, the length and flexibility of the tube being such as to permit of the separation of the standards over any straight or circuitous route. The standard at the point at which the level is to be determined is brought to the same elevation as the opposite standard, by raising and lowering the standard until the required level is in register with the hair line 21. The levels at the two points are marked on adjacent objects by either of the punches 19 or 20, or both. By adjusting the sleeves 13 along the length of their respective pipes, any desired difference of level between two distant points may be obtained. The liquid in flowing from one tubular standard to the other compresses the air in the upper portion of the standard toward which it is traveling, and in this way closes the thimble valve before the liquid has had time to rise sufficiently to flow out. The seating base of the standard not only enables the leveling of two distant points by one person but also adapts the device to be used with accuracy in many places in which levels of this character, without the bases, would not be practical, as, for example, in leveling the line shafting in a shop.

Having thus described my invention, I claim as new and desire to secure by Letters Patent:

1. A level comprising tubular standards adapted to contain a liquid, each having a seating base and a transparent portion through which the liquid is visible, a tube connected at opposite ends with the lower portions of the tubular standards for the passage of the liquid from one tubular standard to the other, and punches to mark the levels on adjacent objects, with one of the punches projecting from the under face of the base and another of the punches projecting from the side of the base.

2. A level comprising tubular standards having a conduit extending between their lower portions placing them in communication, each standard having an externally-threaded jacket provided with slots through which the liquid levels in the standards are visible, and a gage sleeve threaded on each jacket and having slots adapted to register with the slots of the standards.

3. A level comprising tubular standards having a conduit extending between their lower portions, placing them in communication, each standard having a removable cap at the top provided with an upwardly extended tubular portion of reduced diameter, said upwardly-extending tubular portion of each cap having a valve seat, and a free valve arranged within and guided by the walls of the reduced tubular portion of each cap.

In testimony whereof I have signed my name to this specification in the presence of two subscribing witnesses.

JOHN LYTLE RUSSELL.

Witnesses:
JAMES M. KERR,
E. C. WILLIAMS.